(12) United States Patent
Ravichandran et al.

(10) Patent No.: US 10,916,841 B2
(45) Date of Patent: Feb. 9, 2021

(54) TECHNIQUES TO INCREASE ANTENNA-TO-ANTENNA ISOLATION SUITABLE FOR ENHANCED MIMO PERFORMANCE

(71) Applicant: NVIDIA Corporation, San Jose, CA (US)

(72) Inventors: Siddharth Ravichandran, San Jose, CA (US); Srirama Murthy Raju Bhupatiraju, Santa Clara, CA (US); Joselito Gavilan, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 18 days.

(21) Appl. No.: 16/457,785

(22) Filed: Jun. 28, 2019

(65) Prior Publication Data
US 2020/0411979 A1 Dec. 31, 2020

(51) Int. Cl.
*H01Q 1/52* (2006.01)
*H04B 17/345* (2015.01)
*H04B 1/04* (2006.01)

(52) U.S. Cl.
CPC .......... *H01Q 1/521* (2013.01); *H04B 1/0475* (2013.01); *H04B 1/0483* (2013.01); *H04B 17/345* (2015.01)

(58) Field of Classification Search
CPC ................................ H01Q 1/52; H01Q 1/521
See application file for complete search history.

(56) References Cited

U.S. PATENT DOCUMENTS

| 2014/0085158 | A1* | 3/2014 | Wong | H01Q 1/48 343/841 |
| 2014/0225800 | A1* | 8/2014 | Jenwatanavet | H01Q 21/28 343/841 |
| 2016/0093949 | A1* | 3/2016 | Chang | H01Q 1/521 343/841 |

* cited by examiner

*Primary Examiner* — Hoang V Nguyen
(74) *Attorney, Agent, or Firm* — Shook Hardy Bacon L.L.P.

(57) ABSTRACT

Techniques for providing multi-antenna devices with increased antenna-to-antenna isolation as well as methods of operating and manufacturing the same are disclosed. A multi-antenna device may include a support structure, one or more radio devices coupled to a first antenna that is coupled to the support structure at a first location, a second antenna coupled to the support structure at a second location and communicatively coupled to the one or more radio devices, and a conductive structure coupled to the support structure so that it shifts an electric field null of the first antenna from an original location toward the second location during communications using the first antenna, thereby increasing isolation between the first antenna and the second antenna. The conductive structure may have a length of approximately one half of the wavelength (e.g., of 2.4 gigahertz or 5 gigahertz) of a frequency band used for the communications.

20 Claims, 7 Drawing Sheets

TECHNIQUES TO INCREASE ANTENNA-TO-ANTENNA ISOLATION SUITABLE FOR ENHANCED MIMO PERFORMANCE

BACKGROUND

Electronic devices may use multiple antennas to simultaneously receive and/or transmit communications, either in conjunction with one another, or independently. For example, Multiple-Input and Multiple-Output (MIMO) or other related techniques may be used to multiply the capacity of a radio link using multiple transmission and receiving antennas to exploit multipath propagation. When multiple antennas are used, they may at times interfere with each other's operation, which can limit the isolation achieved by the antennas. For example, the isolation between antennas may depend upon how much of the Electromagnetic Field (EMF) of one antenna is absorbed by the other. When the antennas are operating at a similar frequency, such as in MIMO, the amount of EMF that is absorbed may be especially high, which may degrade the performance of an electronic device. In MIMO Wireless Fidelity (Wi-Fi) antenna-antenna isolation should be approximately 13 decibels or greater to achieve maximum throughput performance.

A traditional approach to mitigating interference between antennas includes increasing spacing between the antennas. Other approaches include using signal filters to filter signals processed using the antennas, or frequency separation where the antennas are not operated at the same frequencies. However, these approaches may greatly reduce the flexibility of antenna placement as well as increase the cost and size of an electronic device. Thus, in various cases, such as for compact or small-scale multi-antenna devices, such solutions may present limitations, or otherwise may not be desirable or practical to implement for various reasons. This may result in underperformance of electronic devices using such antennas.

SUMMARY

Embodiments of the present disclosure relate to multi-antenna devices having increased antenna-to-antenna isolation, as well as methods of operating and manufacturing the same. The multi-antenna devices described herein are adapted to provide such increased isolation through incorporation of a conductive structure. The conductive structure may be used to reduce the interference with at least one antenna that is caused by operating one or more other antennas. To do so, the conductive structure may shift, during communications over a selected frequency or frequency band, an electric field null in an EMF generated by at least one antenna from an original location (where the null would be without the conductive structure) toward, or to, a location of another antenna operating on the multi-antenna device, thereby increasing isolation between those antennas. The conductive structure may have a length of approximately one half of the wavelength (e.g., of 2.4 gigahertz or 5 gigahertz) of the selected frequency (e.g., frequency band). However, a quarter wavelength or other fraction of the wavelength may be used, such as where the isolation does not need to be increased as much for desired operation. Disclosed approaches may be used to increase antenna-to-antenna isolation even in relatively small-scale or compact multi-antenna designs, thereby improving the throughput and performance of such devices, among other benefits. These improvements can be realized in such devices even where size or placement constraints may limit the use of conventional solutions.

BRIEF DESCRIPTION OF THE DRAWINGS

The techniques to increase antenna-to-antenna isolation suitable for enhanced MIMO wireless performance are described herein in detail with reference to the attached drawing figures, which are intended to be illustrative and non-limiting in nature, wherein.

DETAILED DESCRIPTION

Figure 1:
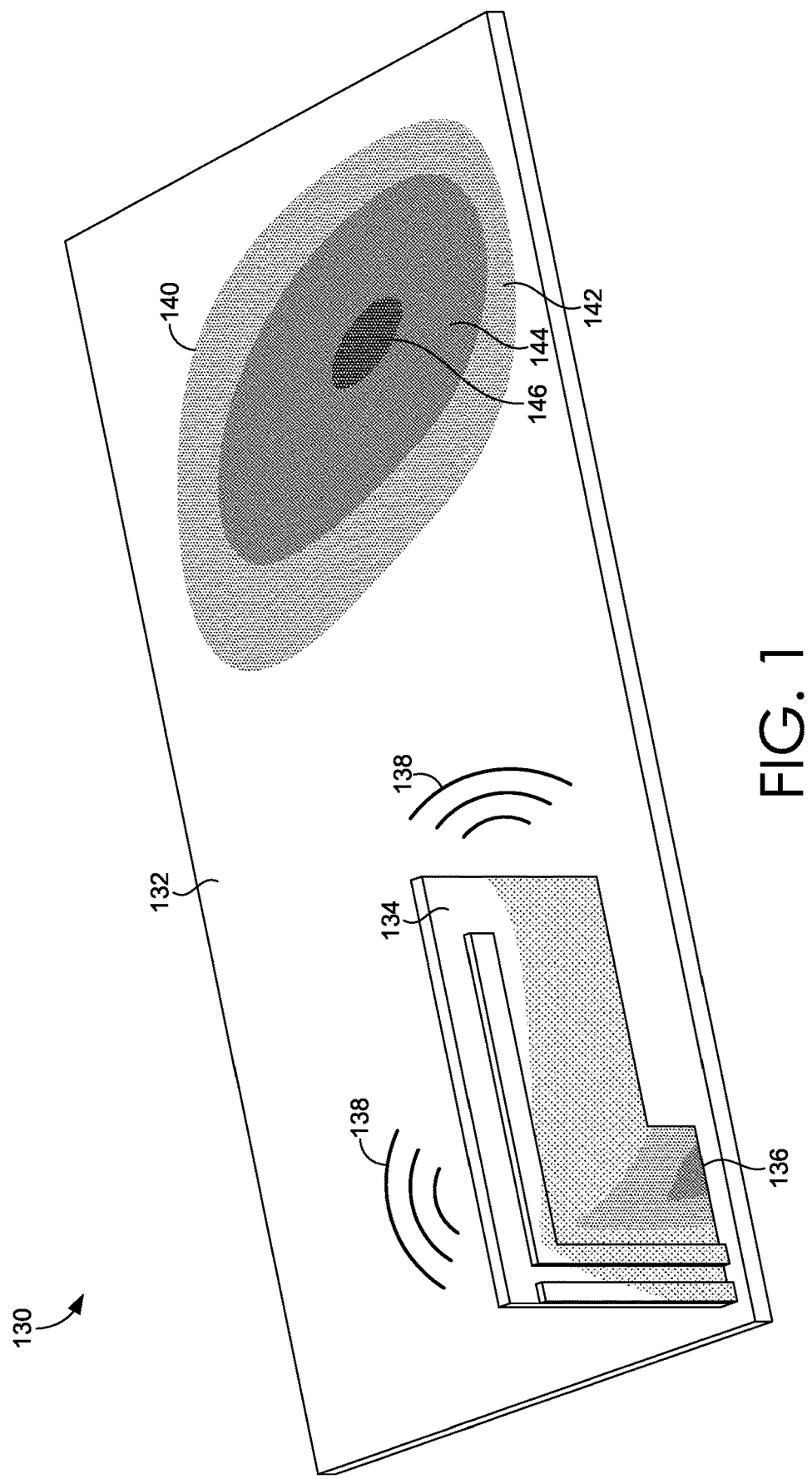
FIG. 1 depicts a multi-antenna device at one stage of assembly and during signal transmission over a selected frequency, in accordance with some embodiments of the present disclosure.

The present disclosure relates to techniques to increase antenna-to-antenna isolation suitable for enhanced MIMO wireless performance. In particular, the present disclosure relates to techniques for adapting multi-antenna device to provide increased antenna-to-antenna isolation during communications over one or more selected frequencies or frequency bands, as well as methods of operating and manufacturing the same.

Multi-antenna devices having separate antennas that process signals over a common frequency or frequency band, e.g., a 2.4 gigahertz frequency band or a 5 gigahertz frequency band, may at times encounter signal interference between the antennas operating on the device. This interference may reduce antenna-to-antenna isolation which, as a result, may limit the throughput and performance of the antennas (e.g., limiting the maximum decibels of isolation that may be achieved between antennas of the multi-antenna device). Conventional solutions for mitigating such interference and increasing antenna-to-antenna isolation generally rely on increasing the distance between the antennas, using filters to modify the signals processed using the antennas, or separating the frequencies used to operate the antennas. However, for various reasons, these solutions may not be practical or desirable, such as in small-scale or compact multi-antenna devices, where the design needs may result in size or component limitations.

Approaches described herein provide multi-antenna devices and/or antenna structures (which may or may not include an integrated circuit, CPU, and/or other circuit components) with improved antenna-to-antenna isolation through incorporation of a conductive structure. The conductive structure may shift an electric field null generated by an antenna operating on the device at a selected frequency to a location of another antenna which may be operating on the device at or near the selected frequency, which reduces signal interference between the antennas and increases isolation, thereby improving throughput and performance while maintaining design flexibility. The conductive structure may have a length of approximately one half of the wavelength (e.g., of 2.4 gigahertz or 5 gigahertz) of the selected frequency (e.g., frequency band). However, a quarter wavelength or other fraction of the wavelength may be used, such as where the isolation does not need to be increased as much for desired operation. Example embodiments providing the aforementioned advantages are described further below with reference to FIGS. 1-7.

Multi-antenna devices in accordance with the present disclosure may take any of a variety of forms and make be embodied as any of a variety of types of devices. By way of example and not limitation, a multi-antenna device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, headphones, a streaming device (e.g., a video streaming device), an entertainment system, a vehicle computer system, an embedded system controller, a remote control, an appliance, a consumer electronic device, a workstation, any combination of these delineated devices, or any other suitable device. Additionally, antennas and/or conductive structures as described herein may be included in one or more housings, which may be shared or separate from a housing that include other electrical components of a multi-antenna device. For example, in some embodiments, one or more of the antennas and/or conductive structures are included in a housing module (e.g., antenna module) which may be connected to a primary housing of the multi-antenna device (e.g., via an antenna connection cable). In other examples, the antennas and/or conductive structures may be within and/or on the primary housing.

Figure 5:
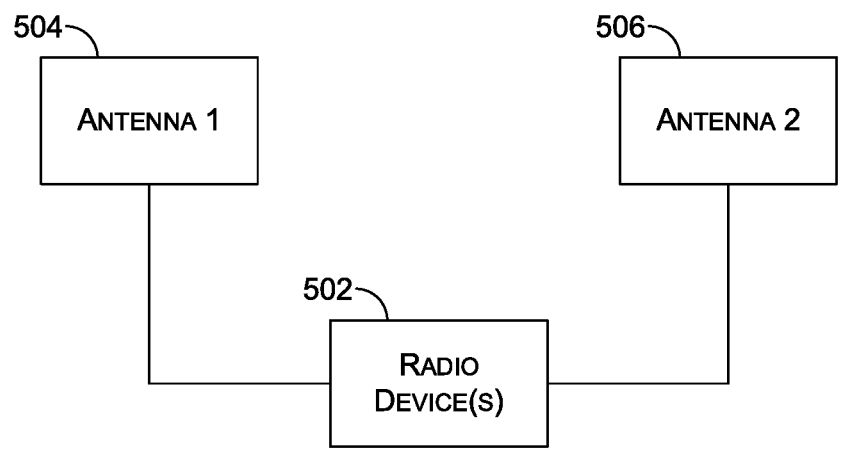
FIG. 5 depicts a configuration of components associated with a multi-antenna device, in accordance with some embodiments of the present disclosure.

Referring now to FIG. 1, a multi-antenna device 130 depicted at one stage of assembly and during signal transmission over a selected frequency is provided, in accordance with some embodiments of the present disclosure. The multi-antenna device 130 shown in FIG. 1 includes a support structure 132 and an antenna 134. The antenna 134 is mechanically coupled (and optionally electrically coupled) to the support structure 132 at a location 136 on the support structure 132. The antenna 134 is also communicatively coupled to one or more radio devices (not depicted in FIG. 2 but an example of which is depicted in FIG. 5). The one or more radio devices may be coupled to, or integrated with, the multi-antenna device 130 in different ways. For example, the one or more radio devices may be mounted directly on the support structure 132 and coupled to the antenna 134 through an integrated circuit located on the support structure 132 in one contemplated aspect. The one or more radio devices may alternatively be located separately from the support structure 132 (e.g., for inclusion in a different housing when fully assembled) and may be communicatively coupled to the antenna 134 through a communication link that extends to the support structure 132 and the antenna 134 in another contemplated aspect.

The one or more radio devices may be adapted to process communications over one or more selected frequencies or frequency bands using the antenna 134. The one or more radio devices, in this respect, may be adapted to send, receive, decode, generate, transfer, or store data signals including those transmitted or received using the antenna 134 and any other antennas that may be incorporated with the multi-antenna device 130 shown in FIG. 1. The one or more radio devices may be adapted to process Wi-Fi communications, Bluetooth communications, and/or other types of wireless and/or near-field communications using the antenna 134 (e.g., using an integrated processor or chip that support such wireless functionality). The one or more radio devices may also be adapted to process communications transmitted or received over one or more selected frequencies (e.g., a certain frequency(ies) or a certain frequency band(s)). For example, the one or more radio devices may be adapted to process communications over a 2.4 gigahertz frequency band and/or over a 5 gigahertz frequency band using at least the antenna 134 (e.g., for MIMO) in contemplated embodiments, in addition to other possible frequencies or frequency bands depending on the configuration of the one or more radio devices and/or the multi-antenna device 130 and components thereof.

The support structure 132 shown in FIG. 1 may provide, from a structural standpoint, support for the components of the multi-antenna device 130, such as, for example, the antenna 134, and other components to be assembled with the multi-antenna device 130 that are not shown in FIG. 1. The term "support structure" as used herein should be interpreted broadly so as to encompass any one or combination of components or structures that collectively form part of the multi-antenna device and support functional components mounted on the multi-antenna device. For example, in some contemplated embodiments, a support structure may comprise a substrate that is formed from one or more materials that exhibit at least some degree of rigidity, allowing components of an associated multi-antenna device to be fixedly mounted thereon. In further contemplated examples, a support structure may include one or more structural features such as, for example, a frame, a housing, a base, etc., that support the mounting of the components of the associated multi-antenna device. In yet a further example, a support structure may comprise one or more functional components of the associated multi-antenna device, such as, for example, communication couplings, power couplings, routing wires, and/or an integrated circuit. The support structure may in embodiments be a printed circuit board ("PCB")—such as a motherboard—having one or more integrated circuits (e.g., housing at least one of the radios), or a similar type of device. Numerous other configurations of the aforementioned support structures and configurations thereof are contemplated as within the scope of the present disclosure.

FIG. 1 depicts the multi-antenna device 130 transmitting a signal over a selected frequency. The signal may be transmitted using the antenna 134 and the one or more radio devices communicatively coupled thereto. This signal transmission is illustrated to show the signal propagation from the antenna 134 when the antenna 134 is transmitting at the selected frequency. In particular, the transmission of the signal over the selected frequency by the antenna 134 generates, as shown in FIG. 1, an electric field 138 (which may also be referred to as EMF 138). The electric field 138 disperses about the antenna 134, generating areas of varying electric field intensity. This includes a low electric field region 140 in which an electric field null may be located. The low electric field region 140 may represent an area of lower or reduced electric field intensity relative to a majority of the electric field 138 formed during the signal transmission from the antenna 134 (or reception).

FIG. 1 further shows how the strength of the electric field 138 varies across the low electric field region 140. As shown, an average strength of the electric field 138 in a first area 142 of the low electric field region 140 may be less than an average strength of the electric field 138 in a second area 144 of the low electric field region 140 which may be less than an average strength of the electric field 138 in a third area 146 of the low electric field region 140 as represented by the separately shaded sections shown on the multi-antenna device 130 depicted in FIG. 1. The third area 146 may represent or contain a local or global minima in the EMF, such as an electric field null where the EMF is substantially zero. For the purposes of the description, discussion of the electric field null also applies to the low electric field region 140 where applicable (e.g., a region containing a local minima or maxima of the EMF which may not contain a null). The location of the low electric field region 140 shown in FIG. 1 is based on the signal propagation from the antenna 134 at the selected frequency (e.g., using a particular frequency or frequency band). Accordingly, the propagation of an electric field and the location of an electric field null formed therefrom may be different based on, for example, the frequency of a signal that is emitted, and/or based on a position, configuration, and/or power of an antenna and/or radio used to emit the signal, among other factors.

The location of an electric field null, such as in the low electric field region 140 shown in FIG. 1, on a multi-antenna device, such as the multi-antenna device 130 shown in FIG. 1, may be determined, for the purposes of configuring the multi-antenna device 130 for increased antenna-to-antenna isolation, using different methods. For example, an electric field null (and/or low electric field region 140) may be located using signal propagation electromagnetic simulation software. The electric field null may alternatively be located using an electric field probe used to monitor EMF measurements of a signal transmission from an antenna (or reception) of a multi-antenna device. The electric field null may further be located using other tools or processes adapted to detect and/or determine the variable intensities of an electric field produced during signal transmission from an antenna (or reception). Each of these tools and processes for locating an electric field null are contemplated as within the scope of the present disclosure.

Figure 2:
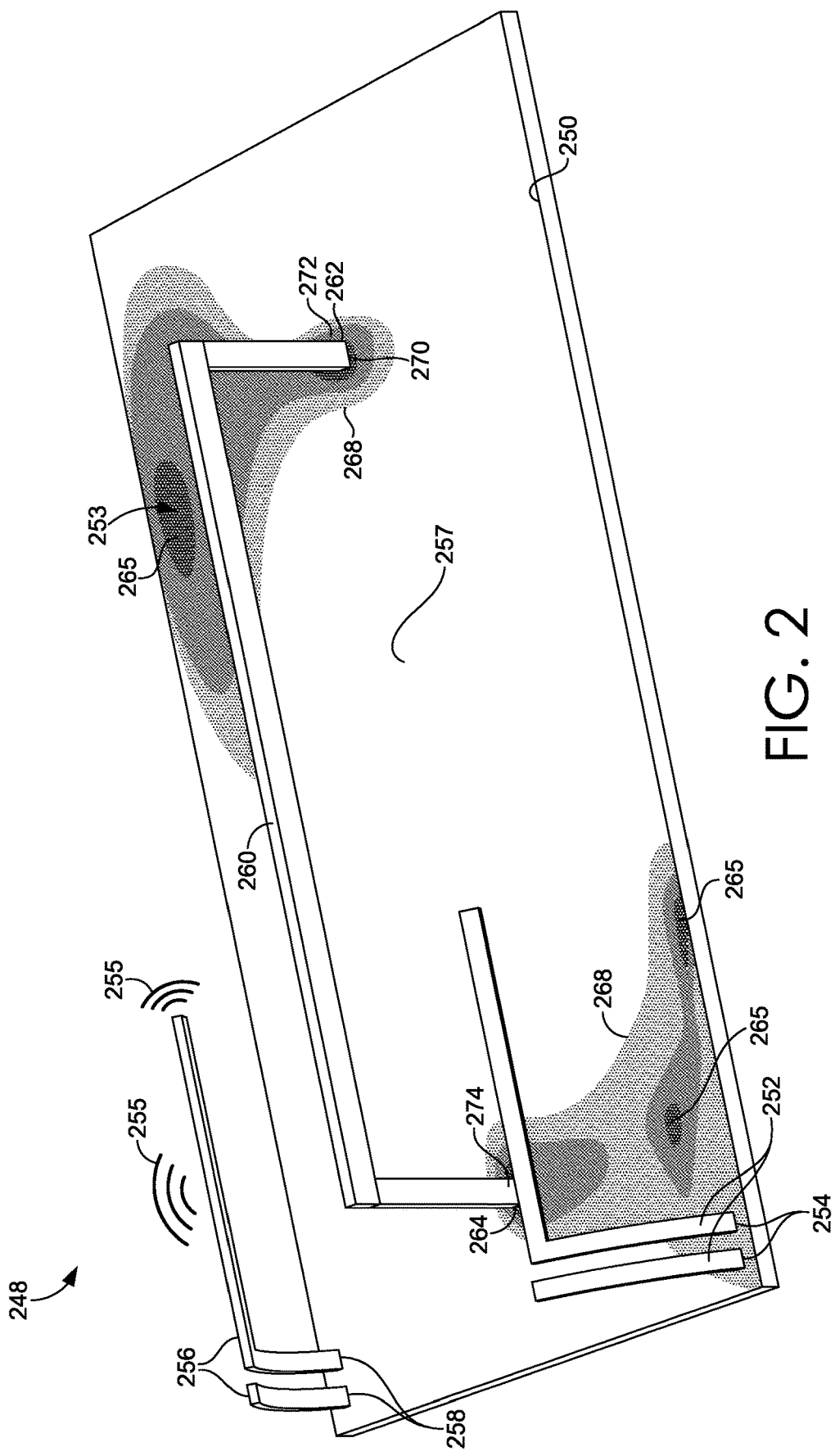
FIG. 2 depicts another multi-antenna device in which a conductive structure has been incorporated to increase antenna-to-antenna isolation during communications over a selected frequency, in accordance with some embodiments of the present disclosure.

The low electric field region 140 represents a region in which a conductive structure, such as a conductive structure 260 as shown in FIG. 2, may be placed to achieve greater antenna-to-antenna isolation in the multi-antenna device 130. For example, the conductive structure (e.g., an end or contact area to the support structure 132) may be at least partially located in the third area 146 (as an example) to shift the third area 146 from the original location of FIG. 1 to a desired location in the multi-antenna device 130 (e.g., on the support structure 132). As discussed herein, the conventional solutions for mitigating signal interference between separate antennas that use the same or similar frequency may not be practical or desirable in certain applications. However, the use of a conductive structure, such as the conductive structure 260 shown in FIG. 2, to shift a location of the third region 146 at least partially towards, or to, a location of another antenna operating with the same or similar frequency (as in FIG. 2) allows for improving the antenna-to-antenna isolation without the limitations of conventional approaches.

Referring now to FIG. 2, a multi-antenna device 248 having the conductive structure 260 incorporated therewith to increase antenna-to-antenna isolation is provided, in accordance with some embodiments of the present disclosure. In examples, the multi-antenna device 248 may correspond to the multi-antenna device 130 of FIG. 1 (although a different antenna design is shown). The multi-antenna device 248 shown in FIG. 2 includes a support structure 250, an antenna 252 coupled to the support structure 250 at a location 254, an antenna 256 coupled to the support structure 250 at a location 258, and the conductive structure 260 that is coupled to the support structure 250 at a contact location 262 and a contact location 264. The multi-antenna device 248 may also include or incorporate, as described with respect to FIG. 1, one or more radio devices (not shown in FIG. 2 but shown as one example in FIG. 5). The one or more radio devices may be communicatively coupled to the antenna 252 and to the antenna 256 (e.g., separately with one radio per antenna, or shared with one radio controlling multiple antennas) and may be adapted to process communications over a selected frequency using the antennas 252, 256. In this respect, the antennas 252, 256 may both use a selected frequency (e.g., a common frequency band) during communications processed by the one or more radio devices. For example, the one or more radio devices may be adapted to process communications over a 2.4 gigahertz band, a 5 gigahertz band, or another frequency band associated with a wireless communication protocol using the antennas 252, 256 (e.g., via MIMO). The antennas 252, 256 may further be adapted to transmit and/or receive communications simultaneously using the selected frequency, or separately using the selected frequency, in embodiments contemplated herein. For example, the antenna(s) 252 may transmit using a frequency band while the antenna(s) 256 transmit (or the antennas 252 and 256 may both receive using the frequency band) using the frequency band. Further, the antenna 252 may transmit/receive data independently from the antenna 256.

The antenna 256 shown in FIG. 2 is transmitting a signal over the selected frequency used by both of the antennas 252, 256 during operation of the multi-antenna device 248. This signal transmission generates an electric field 255 as shown in FIG. 2. The electric field 255 is dispersed around the area surrounding the antenna 256, including across the support structure 250, like the electric field 138 shown in FIG. 1. The electric field 255 varies in intensity based on location, and as a result, low electric field regions 268 may be formed on the support structure 250. The low electric field regions 268 may represent areas where the strength of the electric field 255 produced by the antenna 256 is comparably less than a strength of the electric field 255 present at certain other areas (similar to the low electric field region 140 of FIG. 1), such as, for example, an area 257 located on the support structure 250. Once again, factors such as variations in the frequency and/or power of the emitted signal, variations in the configuration and/or positioning of the antenna 256 on the support structure 250, etc., may affect the distribution of the electric field 255 and the location (and number) of the low electric field regions 268 on the multi-antenna device 248. Therefore, it should be understood that the configuration shown in FIG. 2 and the resulting electric field distribution represents only one example configuration, and other configurations that achieve the described improvements in antenna-to-antenna isolation are contemplated herein.

The low electric field regions 268 includes an original location 270 of the low electric field regions 268 prior to placement of the conductive structure 260. For example, the low electric field region 140 of FIG. 1 may correspond to the low electric field regions 268 prior to incorporation of the conductive structure 260. In examples, the original location 270 may correspond to the third region 146 (e.g., an electric field null) to achieve greater antenna-to-antenna isolation in the multi-antenna device 248. Using this approach, electric field nulls, such as the electric field nulls 265 of FIG. 2, may be shifted from one or more original locations to one or more desired locations, as in FIG. 2.

As discussed herein, conventional solutions for mitigating signal interference between separate antennas that use the same or similar frequency may not be practical or desirable in certain applications. However, the use of a conductive structure, such as the conductive structure 260 shown in FIG. 2, to shift a location of an electric field null(s) of one antenna at least partially towards, or to, a location(s) of another antenna(s) allows for improving the antenna-to-antenna isolation without the limitations of conventional approaches.

The conductive structure 260 shown in FIG. 2 includes an end 272 that is mechanically coupled to the support structure 250 at a contact location 262 and another end 274 that is mechanically coupled to the support structure 250 at a contact location 264. The distance between the ends 272, 274, measured by following along the conductive structure 260 itself, may define a length of the conductive structure 260. The length of the conductive structure 260 may be adapted to affect the shifting of the low electric field regions 268 from the original location 270 as described herein. In accordance with embodiments contemplated herein, the ends 272, 274 of the conductive structure 260 may share a common ground connection with the antenna 252 and/or the antenna 256 through the support structure 250 (e.g., via the ends 272, 274), thereby facilitating an electromagnetic shifting of the low electric field region 268 as shown in FIG. 2.

FIG. 2 depicts how the end 272 of the conductive structure 260 is positioned at the original location 270 of the low electric field region 268 produced during signal transmission by the antenna 256 at the selected frequency. This approach to positioning may be particularly effective in causing the electric field null(s) 265 to shift, such as, towards the location 254 of the antenna 252. The shifted electric field nulls 265 shown in FIG. 2 represent one or more portions of the low electric field region 268 (e.g., an electric field null and/or local or global EMF minima) that has been transferred by the conductive structure 260 from an original location to a new location. The shifted electric field null 265 near (e.g., under) the antenna 252 results in the strength of the electric field 255 proximate to the antenna 252 being lower than it would be without the conductive structure 260, thereby improving its isolation from the antenna 256.

In additional aspects, an electric field null of an EMF (not shown) produced during signal transmission from the antenna 252 (or reception) may be similarly shifted by the conductive structure 260 towards, or to, the location 258 of the antenna 256 to produce a similar improvement in isolation. Additional antennas may also be positioned and used in other areas where an electric field null has been shifted to or is otherwise located on a particular multi-antenna device to allow for additional antenna operation with increased antenna-to-antenna isolation. An example of such a location is location 253 in FIG. 2. For example, antennas 252 and 256 may be used for MIMO communication and an antenna at or near the location 253 may be used for some other purpose (e.g., Bluetooth). In examples, the location 253 may include an electric field null for both antennas 252 and 256 during operation of each at the selected frequency(ies).

Referring still to the multi-antenna device 248 shown in FIG. 2, by shifting the electric field nulls 265 produced during signal communication using the antenna 252 and/or 256 as described above, the signal interference between the antennas 252, 256 may be reduced, thereby increasing the antenna-to-antenna isolation. This increased antenna-to-antenna isolation may improve communication performance and throughput, and may reduce the need to modify the size, shape, or dimensions of the multi-antenna device 248 in order achieve sufficient isolation.

Using approaches described herein, during operation of a multi-antenna device in a 2.4 gigahertz frequency band, an increase in antenna-to-antenna isolation from 7 decibels to at least 15 decibels has been achieved through use of the aforementioned conductive structures. During operation of the multi-antenna device in a 5 gigahertz frequency band, an increase in antenna-to-antenna isolation from 12 decibels to at least 25 decibels has also been achieved through use of the aforementioned conductive structures.

The conductive structures described herein may be formed of different materials and constructions that enable the desired shifting of an electric field null on an associated multi-antenna device. For example, embodiments of a conductive structure may comprise a strip of metal. Further, embodiments of a conductive structure may have a curved shape, or may have a shape that includes one or more angled junctions, as shown, for example, with the conductive structure 260 shown in FIG. 2.

To achieve a desired shifting of the low electric field region(s) 268 towards, or to, the location 254 of the antenna 252, and similarly to achieve a shifting of an electric field null of the antenna 252 to or towards the location 258 of the antenna 256, the conductive structure 260 may be formed to have a length of approximately one half of the wavelength (e.g., of 2.4 gigahertz or 5 gigahertz) of the selected frequency (e.g., frequency band) used by the antenna 252 and the antenna 256 during signal communication (transmit and/or receive). By approximately, it may mean that the length may vary by +/−5% of the wavelength in contemplated variations, with the lengths closest to one half of the wavelength being shown to produce a shift of the low electric field region(s) 268 that results in higher antenna-to-antenna isolation. However, a quarter wavelength or other fraction of the wavelength may be used in embodiments, such as where the isolation does not need to be increased as much for desired operation.

Figure 3:
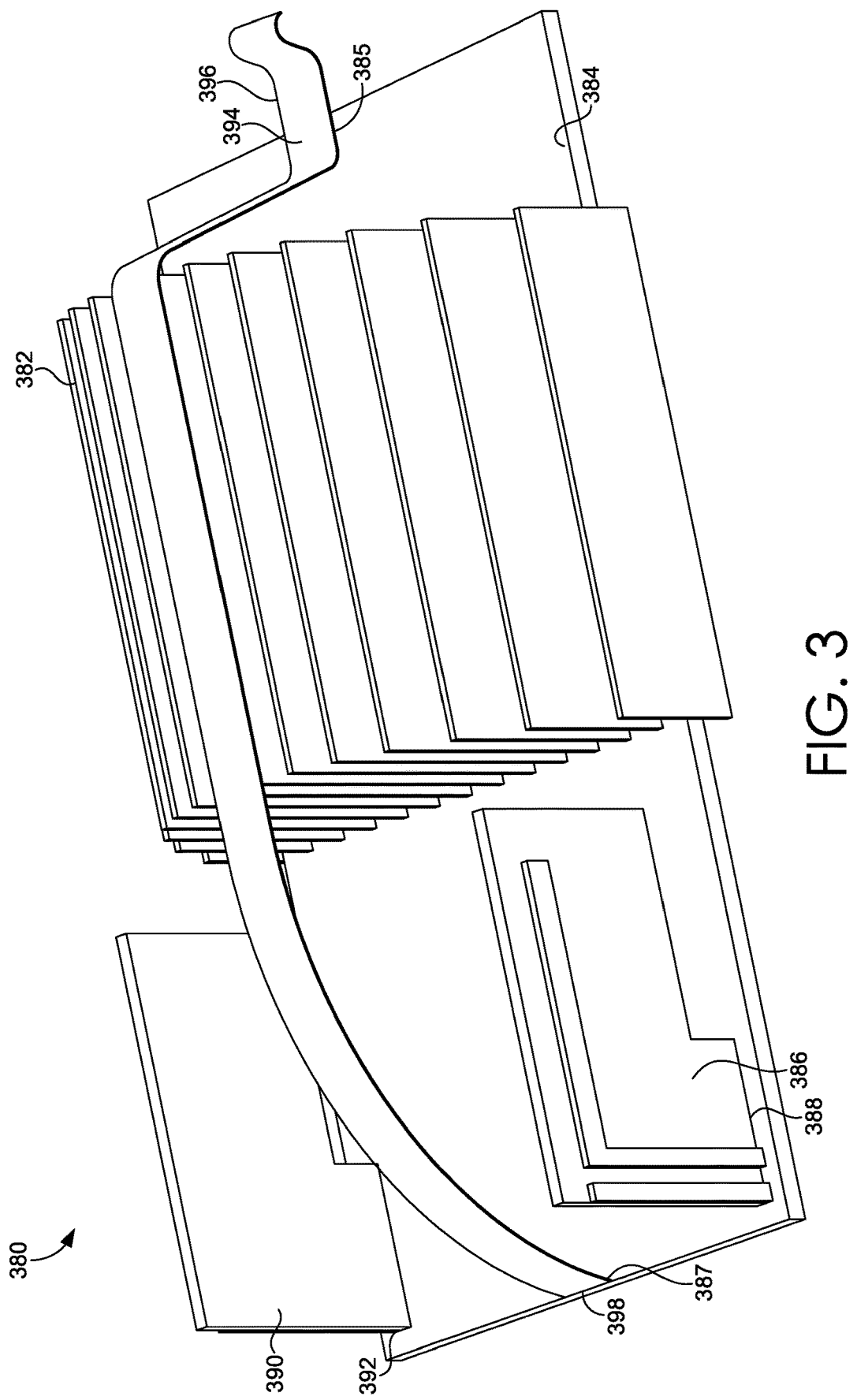
FIG. 3 depicts a multi-antenna device with a conductive structure incorporated over a metallic structure, in accordance with some embodiments of the present disclosure.

Referring now to FIG. 3, a multi-antenna device 380 incorporating a conductive structure 394 and a metallic structure 382 is provided, in accordance with some embodiments of the present disclosure. The multi-antenna device 380, like the other multi-antenna devices depicted and described herein, may be coupled to one or more radio devices, and includes a support structure 384, an antenna 386 (e.g., coupled to the support structure 384 at a location 388), and an antenna 390 (e.g., coupled to the support structure 384 at a location 392). The multi-antenna device 380 also includes the conductive structure 394, which may operate and be configured similarly to the conductive structure 260 of FIG. 2 and variations thereof described herein. The conductive structure 394 forms an elongated shape extending between an end 396 and an end 398. The ends 396, 398 are each mechanically (and optionally electrically) coupled to the support structure 384 at respective contact locations 385, 387. The contact locations 385, 387 may provide a common ground connection between the conductive structure 394 and the antennas 386, 390 in contemplated embodiments.

FIG. 3 depicts how the ends 396, 398 of the conductive structure 394 are coupled to the support structure 384 at the contact locations 385, 387 thereby shifting an electric field null(s) associated with the antenna 386 and/or with the antenna 390 toward, or to, a location of the other of the antennas 386, 390. This shifting of the electric field null(s) improves the antenna-to-antenna isolation between the antennas 386, 390 as described herein in further detail with respect to FIG. 2. The conductive structure 394 (e.g., a mechanical clip) is additionally positioned and secured to the support structure 384 such that it, at least in part, mechanically couples or secures the metallic structure 382 to the support structure 384. The conductive structure 394 may share a common ground connection with the antenna 386 and the antenna 390 through the contact locations 385, 387 on the support structure 384. However, the conductive structure 394 may not, in the depicted embodiment, obtain an additional ground connection with the antennas 386, 390 through the metallic structure 382. For example, the metallic structure 382 may provide an insulated, non-conductive mechanical bridge between the conductive structure 394 and the support structure 384 (e.g., with an interposed integrated circuit). In the example shown, the metallic structure 382 may correspond to any number of metallic structures, and in non-limiting examples may comprise a heat sink or other structure. The conductive structure 394 may work in tandem with the metallic structure(s) 382 by elongating antenna beam length. The conductive structure 394 may have a length that is approximately equal to one half of a wavelength of the frequency used by the antenna 386 and/or the antenna 390, allowing the conductive structure 394 to shift the electric field null(s) associated with signal communication using the antennas 386, 390 to locations that provide higher antenna-to-antenna isolation as described herein. The conductive structure 394 and/or the metallic structure(s) 382 may be one part (e.g., having a unitary composition), or may be formed by any number of separate parts.

The antennas that may be used in implementations of the present disclosure may take various forms and may be located in various locations, some of which have been described herein. For example, the antennas 134, 252, 256, 390, and 386 are non-limiting examples and configurations of antennas. As further examples, an antenna in accordance with the disclosure may be integrated, at least partially, into the support structure and/or a PCB. For example, one or more of the antennas may be etched on a PCB. Additionally, relative locations of antennas and the conductive structures 260, 394 are shown as only examples, and may vary in different implementations. For example, the conductive structure 260 need not be between the antennas 252 and 256 in some embodiments, but may be in any suitable location for shifting an electric field null as described herein (e.g., closer to one of the antennas than the other, at least partially underneath one of the antennas, not between the antennas as shown, having its length extending past both sides of one or more of the antennas as opposed to one shown in FIG. 2, etc.).

Figure 4:
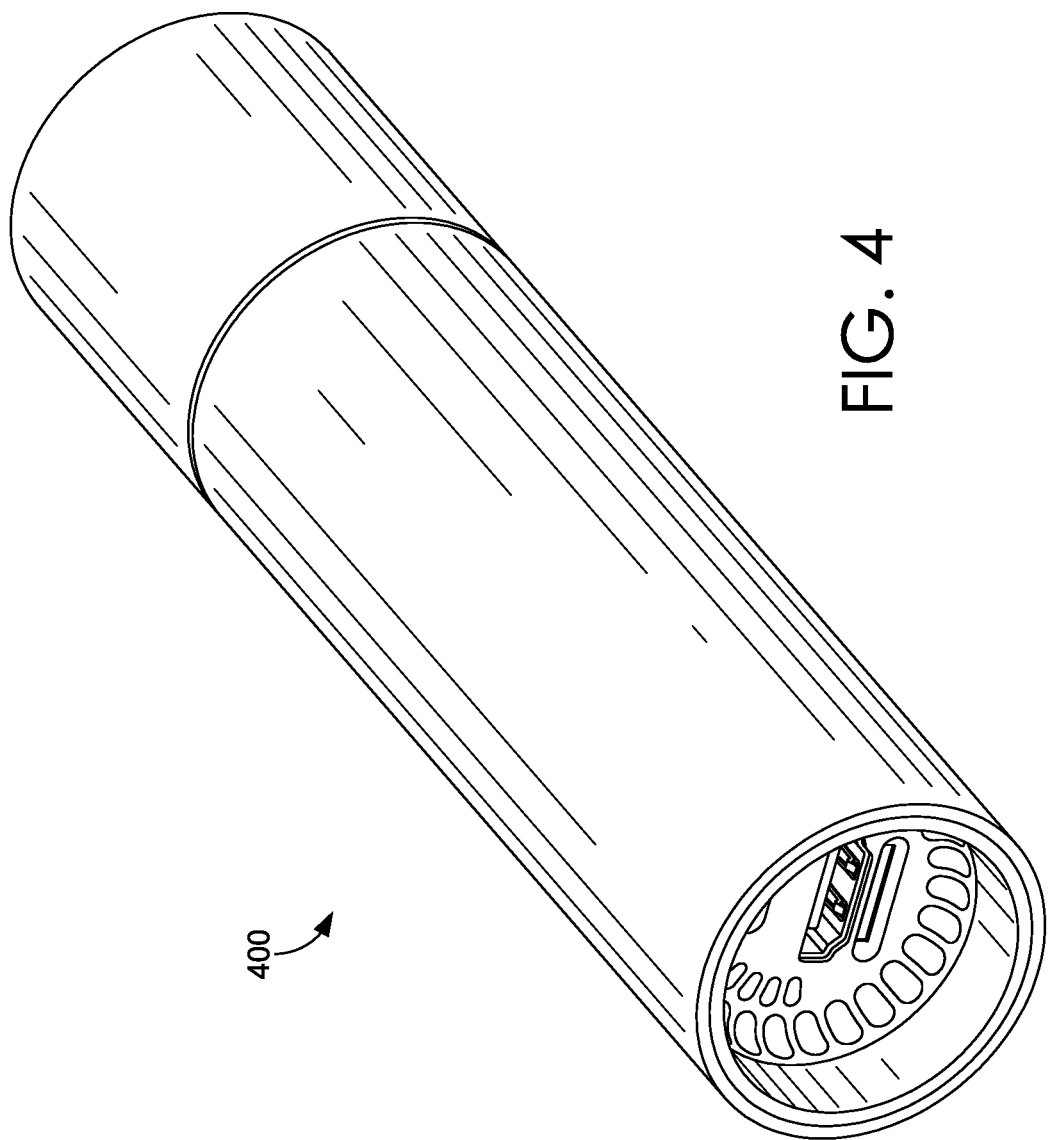
FIG. 4 depicts an example housing of a multi-antenna device, in accordance with some embodiments of the present disclosure.

Referring now to FIG. 4, a housing 400 for a multi-antenna device is provided, in accordance with some embodiments of the present disclosure. The housing 400 may be sized and shaped to allow a multi-antenna device, such as the multi-antenna device 248 shown in FIG. 2 or the multi-antenna device 380 shown in FIG. 3, adapted to provide increased antenna-to-antenna isolation to be at least partially enclosed therein. The housing 400 and multi-antenna device(s) at least partially enclosed therein may be used to implement various electronics, such as, for example, computing devices, gaming devices, televisions, and other electronics and hardware in contemplated embodiments.

The housing 400 shown in FIG. 4 is provided as only one example of a housing for a multi-antenna device having improved antenna-to-antenna isolation, and housings of other shapes, sizes, and configurations suitable for accommodating different multi-antenna devices of different sizes, shapes, and dimensions are contemplated as within the scope of the present disclosure.

Referring now to FIG. 5, an example configuration of components associated with a multi-antenna device having improved antenna-to-antenna isolation is provided, in accordance with some embodiments of the present disclosure. A multi-antenna device as described herein may include multiple antennas that are communicatively coupled to one or more radio devices as shown for example in FIG. 5. FIG. 5 in particular depicts one configuration of components that includes a radio device(s) 502, which may be adapted to process communications over one or more particular frequencies or frequency bands, such as a 2.4 gigahertz frequency band and/or a 5 gigahertz frequency band (e.g., using MIMO), and antenna 504 and antenna 506, each of which is communicatively coupled to the radio device(s) 502. The radio device(s) 502 may be communicatively coupled to, or form part of, the computing device 700 described with respect to FIG. 7, and may process communications using the antenna 504, the antenna 506, and in some embodiments, the components of the computing device 700 shown in FIG. 7. The antennas 504, 506 may use a selected frequency for communications that is common to both antennas 504, 506 and which is processed by the radio device(s) 502. The radio device(s) 502 may include or connect to a multi-antenna device one or more communication chips that enable or support wireless communications over a particular wireless communication protocol. For example, in one contemplated embodiment, a multi-antenna device and one or more radio devices thereof may use a Wi-Fi or Bluetooth-enabled chip to support wireless communications from the multi-antenna device.

In operation, a multi-antenna device may process communications over a selected frequency using one or more radio devices and at least a first antenna. The one or more radio devices may correspond, for example, to the one or more radio devices described with respect to FIGS. 1, 2, and/or 5. The first antenna may correspond, for example, to the antenna 256 described with respect to FIG. 2, and may be coupled to a support structure, such as the support structure 250 shown in FIG. 2, at a first location, such as the location 258 shown in FIG. 2. The selected frequency used during the communications may be any frequency suitable for a wireless communications protocol, such as, for example, those using a 2.4 gigahertz frequency band and/or a 5 gigahertz frequency band, or another frequency or frequency band associated with a wireless communication protocol.

The multi-antenna device, which may correspond to the multi-antenna device 248 described with respect to FIG. 2, or another embodiment of a multi-antenna device in accordance with the embodiments contemplated herein, may further include a second antenna coupled to the one or more radio devices. The second antenna may correspond, for example, to the antenna 252 described with respect to FIG. 2. The second antenna may be coupled to the support structure at a second location, such as the location 254 of the antenna 252 shown in FIG. 2.

The multi-antenna device may be configured so that an electric field null of the first antenna is shifted during the communications from an original location toward the second location by a conductive structure coupled to the support structure thereby increasing isolation between the first antenna and the second antenna. The conductive structure may correspond, for example, to the conductive structure 260 shown in FIG. 2, and may share a common ground connection with the first antenna and the second antenna. The conductive structure may further be formed to have a length of approximately one half of a wavelength of the selected frequency.

Figure 6:
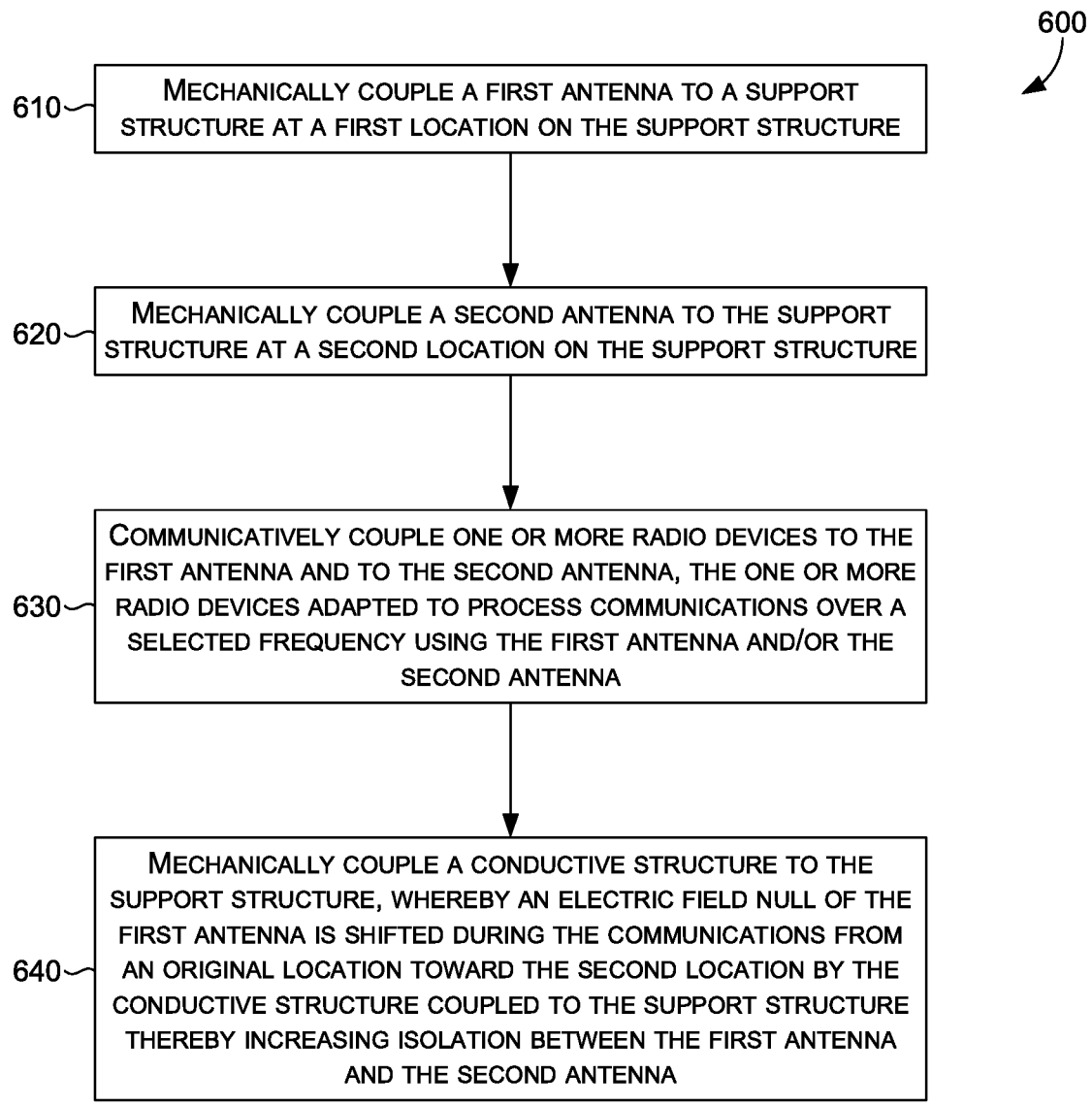
FIG. 6 depicts a block diagram showing an example method of manufacturing a multi-antenna device, in accordance with some embodiments of the present disclosure.

Referring now to FIG. 6, a flow diagram showing an example method 600 of manufacturing a multi-antenna device is provided, in accordance with some embodiments of the present disclosure. The method 600, at block 610, includes mechanically coupling a first antenna, such as the antenna 256 shown in FIG. 2, to a support structure, such as the support structure 250 shown in FIG. 2, at a first location on the support structure, such as the location 258 shown in FIG. 2.

The method 600, at block 620, includes mechanically coupling a second antenna, such as the antenna 252 shown in FIG. 2, to the support structure at a second location on the support structure, such as the location 254 shown in FIG. 2.

The method 600, at block 630, includes communicatively coupling one or more radio devices, such as the radio device(s) 502 shown in FIG. 5, to the first antenna and to the second antenna, the one or more radio devices adapted to process communications over a selected frequency, such as, for example, a 2.4 gigahertz frequency band or a 5 gigahertz frequency band, using the first antenna and/or the second antenna.

The method 600, at block 640, further includes mechanically coupling a conductive structure, such as the conductive structure 260 shown in FIG. 2, to the support structure, whereby an electric field null of the first antenna is shifted during the communications from an original location, such as the original location 270 shown in FIG. 2, toward the second location by the conductive structure coupled to the support structure thereby increasing isolation between the first antenna and the second antenna.

Figure 7:
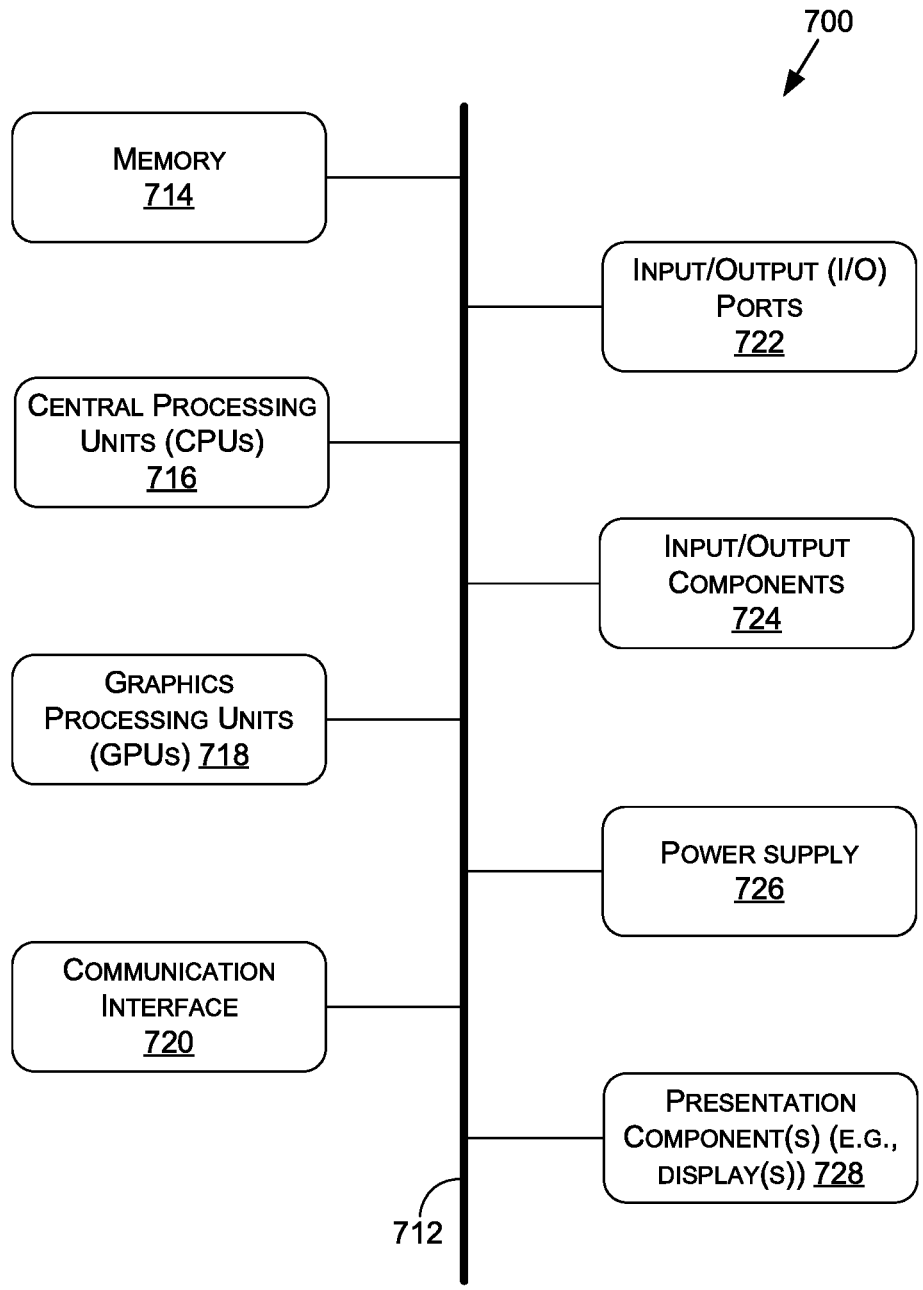
FIG. 7 depicts an example computing device suitable for implementing some embodiments of the present disclosure.

Referring now to FIG. 7, a block diagram of an example computing device 700 suitable for use in implementing some embodiments of the present disclosure is provided. The computing device 700 may include a bus 712 that directly or indirectly couples the following devices: memory 714, one or more central processing units (CPUs) 716, one or more graphics processing units (GPUs) 718, a communication interface 720, input/output (I/O) ports 722, input/output components 724, a power supply 726, and one or more presentation components 728 (e.g., display(s)).

Although the various blocks of FIG. 7 are shown as connected via the bus 712 with lines, this is not intended to be limiting and is for clarity only. For example, in some embodiments, a presentation component 728, such as a display device, may be considered an I/O component 724 (e.g., if the display is a touch screen). As another example, the CPUs 716 and/or GPUs 718 may include memory (e.g., the memory 714 may be representative of a storage device in addition to the memory of the GPUs 718, the CPUs 716, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 712 may represent one or more busses, such as an address bus, a data bus, a control bus, or a combination thereof. The bus 712 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 714 may include any of a variety of computer-readable media. The computer-readable media may be any available media that may be accessed by the computing device 700. The computer-readable media may include both volatile and non-volatile media, as well as removable and non-removable media. By way of example, and not limitation, the computer-readable media may comprise computer-storage media and communication media.

The computer-storage media may include both volatile and non-volatile media and/or removable and non-removable media implemented in any method or technology for storage of information such as computer-readable instructions, data structures, program modules, and/or other data types. For example, the memory 714 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The CPU(s) 716 may be configured to execute the computer-readable instructions to control one or more components of the computing device 700 to perform one or more of the methods and/or processes described herein. The CPU(s) 716 may each include one or more cores (e.g., one, two, four, eight, twenty-eight, seventy-two, etc.) that are capable of handling a multitude of software threads simultaneously. The CPU(s) 716 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include the one or more CPUs 716 in addition to one or more microprocessors or supplementary co-processors, such as math co-processors.

The GPU(s) 718 may be used by the computing device 700 to render graphics (e.g., 3D graphics). The GPU(s) 718 may include hundreds or thousands of cores that are capable of handling hundreds or thousands of software threads simultaneously. The GPU(s) 718 may generate pixel data for output images in response to rendering commands (e.g., rendering commands from the CPU(s) 716 received via a host interface). The GPU(s) 718 may include graphics memory, such as display memory, for storing pixel data. The display memory may be included as part of the memory 714. The GPU(s) 718 may include two or more GPUs operating in parallel (e.g., via a link). When combined together, each GPU 718 may generate pixel data for different portions of an output image or for different output images (e.g., a first GPU for a first image and a second GPU for a second image). Each GPU may include its own memory, or may share memory with other GPUs. In examples where the computing device 700 does not include the GPU(s) 718, the CPU(s) 716 may be used to render graphics.

The communication interface 720 may include one or more receivers, transmitters, and/or transceivers that enable the computing device 700 to communicate with other computing devices via an electronic communication network, including via wired and/or wireless communications. The communication interface 700 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 722 may enable the computing device 700 to be logically coupled to other devices including the I/O components 724, the presentation component(s) 728, and/or other components, some of which may be built in to (e.g., integrated in) the computing device 700. Illustrative I/O components 724 include a microphone, mouse, keyboard, joystick, game pad, game controller, satellite dish, scanner, printer, wireless device, etc. The I/O components 724 may provide a natural user interface (NUI) that processes air gestures, voice, or other physiological inputs generated by a user. In some instances, inputs may be transmitted to an appropriate network element for further processing. A NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion). In some examples, the output of the accelerometers or gyroscopes may be used by the computing device 700 to render immersive augmented reality or virtual reality.

The power supply 726 may include a hard-wired power supply, a battery power supply, or a combination thereof. The power supply 726 may provide power to the computing device 700 to enable the components of the computing device 700 to operate.

The presentation component(s) 728 may include a display (e.g., a monitor, a touch screen, a television screen, a heads-up-display (HUD), other display types, or a combination thereof), speakers, and/or other presentation components. The presentation component(s) 728 may receive data from other components (e.g., the GPU(s) 718, the CPU(s) 716, etc.), and output the data (e.g., as an image, video, sound, etc.).

The disclosure may be described in the general context of computer code or machine-useable instructions, including computer-executable instructions, such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A multi-antenna device, comprising:
   a support structure;
   one or more radio devices adapted to process communications over a selected frequency using a first antenna that is coupled to the support structure at a first location;
   a second antenna coupled to the support structure at a second location, the second antenna communicatively connected to the one or more radio devices; and
   a conductive structure positioned on the support structure whereby the conductive structure shifts an electric field null of the first antenna from an original location toward the second location during the communications using the first antenna thereby increasing isolation between the first antenna and the second antenna.

2. The multi-antenna device of claim 1, wherein the conductive structure comprises a strip of metal having a first end mechanically coupled to the support structure at a first contact location and a second end mechanically coupled to the support structure at a second contact location that is spaced from the first contact location.

3. The multi-antenna device of claim 2, wherein a length of the conductive structure measured between the first end of the strip of metal and the second end of the strip of metal is approximately one half of a wavelength of the selected frequency.

4. The multi-antenna device of claim 1, further comprising a metallic structure, wherein the conductive structure is mechanically coupled over the metallic structure thereby at least partially securing the metallic structure to the support structure.

5. The multi-antenna device of claim 1, wherein the one or more radio devices are adapted to process the communications over a 2.4 gigahertz frequency band, and wherein a position of the conductive structure causes the isolation between the first antenna and the second antenna to be at least 15 decibels.

6. The multi-antenna device of claim 1, wherein the one or more radio devices are adapted to process the communications over a 5 gigahertz frequency band, and wherein a position of the conductive structure causes the isolation between the first antenna and the second antenna to be at least 25 decibels.

7. The multi-antenna device of claim 1, wherein the one or more radio devices comprise at least one of a Wi-Fi radio device or a Bluetooth radio device.

8. The multi-antenna device of claim 1, wherein the first antenna and the second antenna are both configured for one or more of transmitting over the selected frequency or receiving over the selected frequency.

9. The multi-antenna device of claim 1, wherein the conductive structure shares a common ground connection with the first antenna and the second antenna.

10. The multi-antenna device of claim 1, wherein at least a portion of the conductive structure is positioned at the original location.

11. The multi-antenna device of claim 1, wherein a location of an electric field null of the second antenna is proximate the first location during the communications.

12. A method of operating a multi-antenna device, the method comprising:
   processing communications over a selected frequency using one or more radio devices and a first antenna,
   the one or more radio devices communicatively coupled to the first antenna and to a second antenna,
   the first antenna coupled to a support structure at a first location on the support structure, and
   the second antenna coupled to the support structure at a second location on the support structure,
   wherein an electric field null of the first antenna is shifted during the communications from an original location toward the second location by a conductive structure coupled to the support structure thereby increasing isolation between the first antenna and the second antenna.

13. The method of claim 12, wherein the conductive structure comprises a strip of metal having a first end mechanically coupled to the support structure at a first contact location and a second end mechanically coupled to the support structure at a second contact location that is spaced from the first contact location, and wherein a length of the conductive structure is approximately one half of a wavelength of the selected frequency.

14. The method of claim 12, wherein the communications are over a 2.4 gigahertz frequency band or a 5 gigahertz frequency band.

15. The method of claim 12, wherein at least a portion of the conductive structure is positioned at the original location.

16. The method of claim 12, wherein the conductive structure shares a common ground connection with the first antenna and the second antenna.

17. A multi-antenna device, comprising:
   a support structure;
   one or more radio devices adapted to process communications over a selected frequency using a first antenna that is coupled to the support structure at a first location;
   a second antenna coupled to the support structure at a second location, the second antenna communicatively coupled to the one or more radio devices; and
   a conductive structure coupled to the support structure, the conductive structure having a first end coupled to the support structure at a first contact location and a second end coupled to the support structure at a second contact location that is spaced from the first contact location,
   wherein the conductive structure, the first antenna, and the second antenna share a common ground connection,
   wherein a position of the conductive structure relative to the first antenna is adapted to cause a local or global minima of an electromagnetic field of the first antenna to shift from an original location to the second location during the communications thereby increasing isolation between the first antenna and the second antenna, and
   wherein the first contact location is the original location.

18. The multi-antenna device of claim 17, wherein the position of the conductive structure causes a local or global minima of an electromagnetic field of the second antenna to shift to the first location during the communications.

19. The multi-antenna device of claim 17, wherein a length of the conductive structure measured between the first end and the second end of the conductive structure is approximately one half of a wavelength of the selected frequency.

20. The multi-antenna device of claim 17, wherein the communications are over a 2.4 gigahertz frequency band or a 5 gigahertz frequency band.

* * * * *